United States Patent
Todd

(10) Patent No.: US 10,843,775 B2
(45) Date of Patent: Nov. 24, 2020

(54) TOWABLE CARRIER FOR WATERCRAFT

(71) Applicant: Patricia Lynn Todd, Buchanan, TN (US)

(72) Inventor: Patricia Lynn Todd, Buchanan, TN (US)

(*) Notice: Subject to any disclaimer, the term of this patent is extended or adjusted under 35 U.S.C. 154(b) by 115 days.

(21) Appl. No.: 16/262,381

(22) Filed: Jan. 30, 2019

(65) Prior Publication Data
US 2019/0233064 A1    Aug. 1, 2019

Related U.S. Application Data

(60) Provisional application No. 62/623,698, filed on Jan. 30, 2018.

(51) Int. Cl.
| | |
|---|---|
| *B63B 32/80* | (2020.01) |
| *B63B 32/70* | (2020.01) |
| *B60R 9/08* | (2006.01) |
| *B60R 9/06* | (2006.01) |
| *B63B 17/00* | (2006.01) |

(52) U.S. Cl.
CPC .............. *B63B 32/80* (2020.02); *B60R 9/06* (2013.01); *B60R 9/08* (2013.01); *B63B 17/00* (2013.01); *B63B 32/70* (2020.02); *B63B 2017/0054* (2013.01)

(58) Field of Classification Search
CPC . B63B 17/00; B63B 2017/0054; B63B 32/70; B63B 32/80; B63B 32/83; B63B 32/87; B63B 21/56; B63B 34/60; B60P 7/02; B60P 7/04; B60P 7/0876; B60R 9/00; B60R 9/06; B60R 9/08; B60R 9/10; B60R 9/12
See application file for complete search history.

(56) References Cited

U.S. PATENT DOCUMENTS

| | | | | |
|---|---|---|---|---|
| 3,805,722 | A * | 4/1974 | Melchert, Jr. | B63B 17/00 114/343 |
| 4,232,806 | A * | 11/1980 | Shald | B60R 9/12 211/70.5 |
| 4,372,243 | A * | 2/1983 | Roope, Jr. | B63B 17/00 114/343 |
| 4,394,947 | A * | 7/1983 | Tartaglia | B60R 9/06 224/519 |
| D329,838 | S * | 9/1992 | Dean | D12/318 |
| D341,121 | S * | 11/1993 | Trahan, Sr. | D12/318 |
| 5,454,342 | A * | 10/1995 | Colquett | B63B 25/18 114/364 |
| 6,866,001 | B1 * | 3/2005 | Cuccia | B63B 23/62 114/343 |
| 7,370,599 | B1 * | 5/2008 | Berman | B63B 15/00 114/364 |
| 9,663,197 | B2 * | 5/2017 | Bires | B63B 29/04 |

* cited by examiner

*Primary Examiner* — Ajay Vasudeva
(74) *Attorney, Agent, or Firm* — Dunlap Bennett & Ludwig, PLLC

(57) ABSTRACT

A system for towing watercraft embodying a towable carrier is provided. The towable carrier is adapted to attach to tow components of a towing vehicle, while sandwiching the towable object between netting an arrangement of strapping and padding. The towable carrier provides netting that spans a framework, wherein the framework attaches to the tow components by way of adjustable strapping, sleeves and clamps pivotably connected to the framework.

8 Claims, 3 Drawing Sheets

TOWABLE CARRIER FOR WATERCRAFT

CROSS-REFERENCE TO RELATED APPLICATION

This application claims the benefit of priority of U.S. provisional application No. 62/623,698, filed 30 Jan. 2018, the contents of which are herein incorporated by reference.

BACKGROUND OF THE INVENTION

The present invention relates to watercraft accessories and, more particularly, a system for towing watercraft on a waterway or on the roadway.

When transporting watercraft not in use, either when towing on the roads or on the waterways, wind threatens to dislodge such unused watercraft from the towing vehicle, threaten the driver, fellow travelers and bystanders alike. Currently, suction cups are used to prevent the watercraft from going airborne. Unfortunately, when water is present, suction cups tend to lose their grip, undermining their effectiveness. Also, the high winds encountered during driving, can overpower the resistance and stability of suction cups stuck to the side of the watercraft or towing vehicle. Further, suction cups tend to be bulky items taking up valuable storage space during an expedition as well as allowing space between the towed watercraft and the towing vehicle, a space affording surface area that wind can use to lift the towed watercraft from the hold of the suction cups, even if there are objects and people sitting in the towed watercraft to keep them weighted down.

As can be seen, there is a need for a system for towing watercraft by incorporating a towable carrier as a permanent feature joined to an existing tow bar of the towing vehicle. The towable carrier may include a frame having adjustable securing straps for a user to selectively hold a tube to the towable carrier. Thereby, creating a safe way to transport large and small towed watercraft, lessening the risk of the towable objects from becoming airborne.

SUMMARY OF THE INVENTION

In one aspect of the present invention, a towable carrier for watercraft includes the following: a generally U-shaped framework, said U-shape having a distal base and two legs extending generally perpendicularly from opposing ends of the distal base; a netting substantially coplanar with the framework extending through an area defined by the U-shape thereof; a joining component at a terminal end of each leg of the U-shape; a first connector adjacent to each joining component; a plurality strapping extending between the distal base and the terminal ends for removably attaching to the first connectors, wherein the plurality of strapping is movable between one or more open configurations and a sandwiching configuration removably attached to the first connectors; a pivot arm pivotably connected to the framework; and a removable fastener provided near an end of each pivot arm, wherein each removable fastener and joining component is for removably connecting to a towing component of a towing vehicle; a pad disposed between opposing ends of the plurality of strapping for being operatively associated with the watercraft in the sandwiching configuration; a pad strap extending from the pad; and an openable sleeve attached to the pad strap, wherein the openable sleeve is for removably connecting to said towing component, and wherein the openable sleeve is movable between an open condition and a closed condition forming a tube for removably connecting to said towing component; and including a hook and loop fasteners for securing the openable sleeve in the closed condition.

In another aspect of the present invention, a system for towing watercraft behind a motorboat includes the above-mentioned towable carrier of watercraft; and the towing component being an attachment frame extending upwardly from a stern of the motorboat so that the framework is elevated above all motor equipment when said towable carrier is removably connected to said towing component.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system for towing watercraft embodying a towable carrier adapted to attach to pre-existing or retrofitted tow components of a towing vehicle. The towable carrier provides netting that spans a framework for supporting the towable object. The framework also provides strapping and pivot arms for attaching to the tow components, wherein the towable object is sandwiched between the netting and the strapping.

Figure 1:
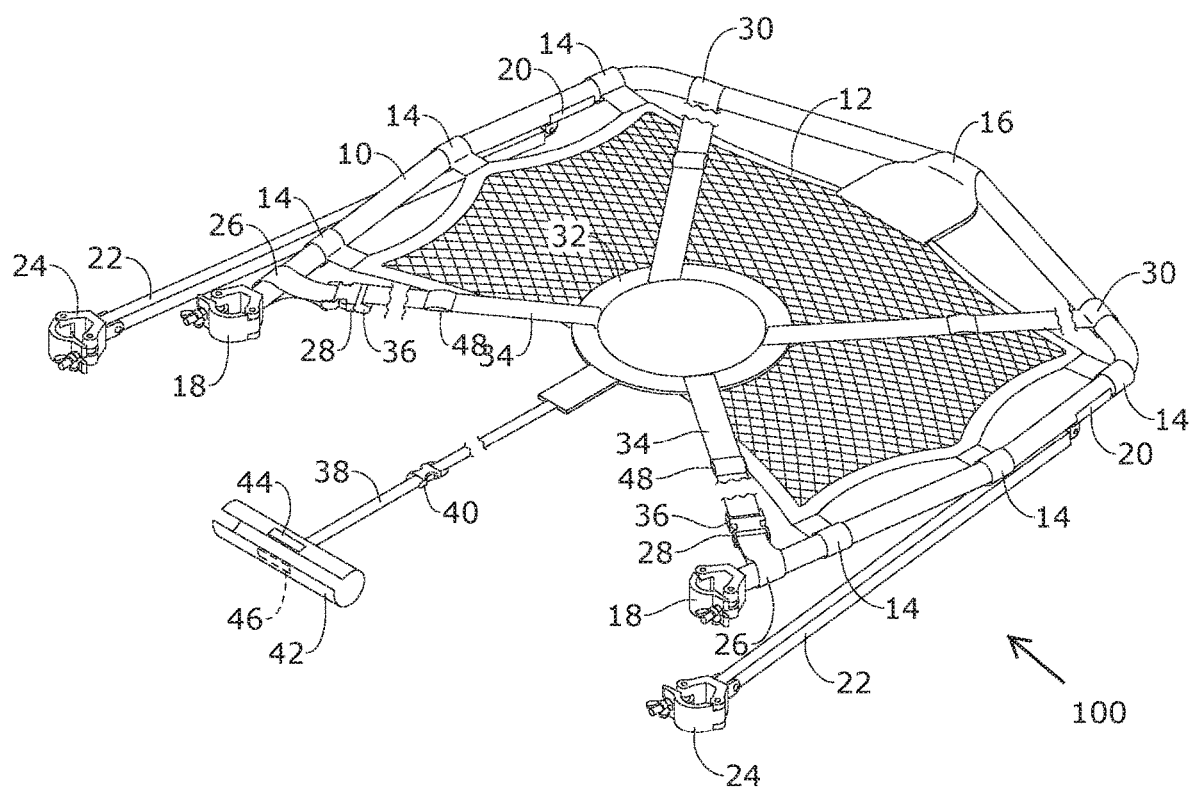
FIG. 1 is a perspective view of an exemplary embodiment of the present invention, shown in a flat (stored) position, with straps 30, 34, and 38 broken to illustrate indeterminate length.
Figure 2:
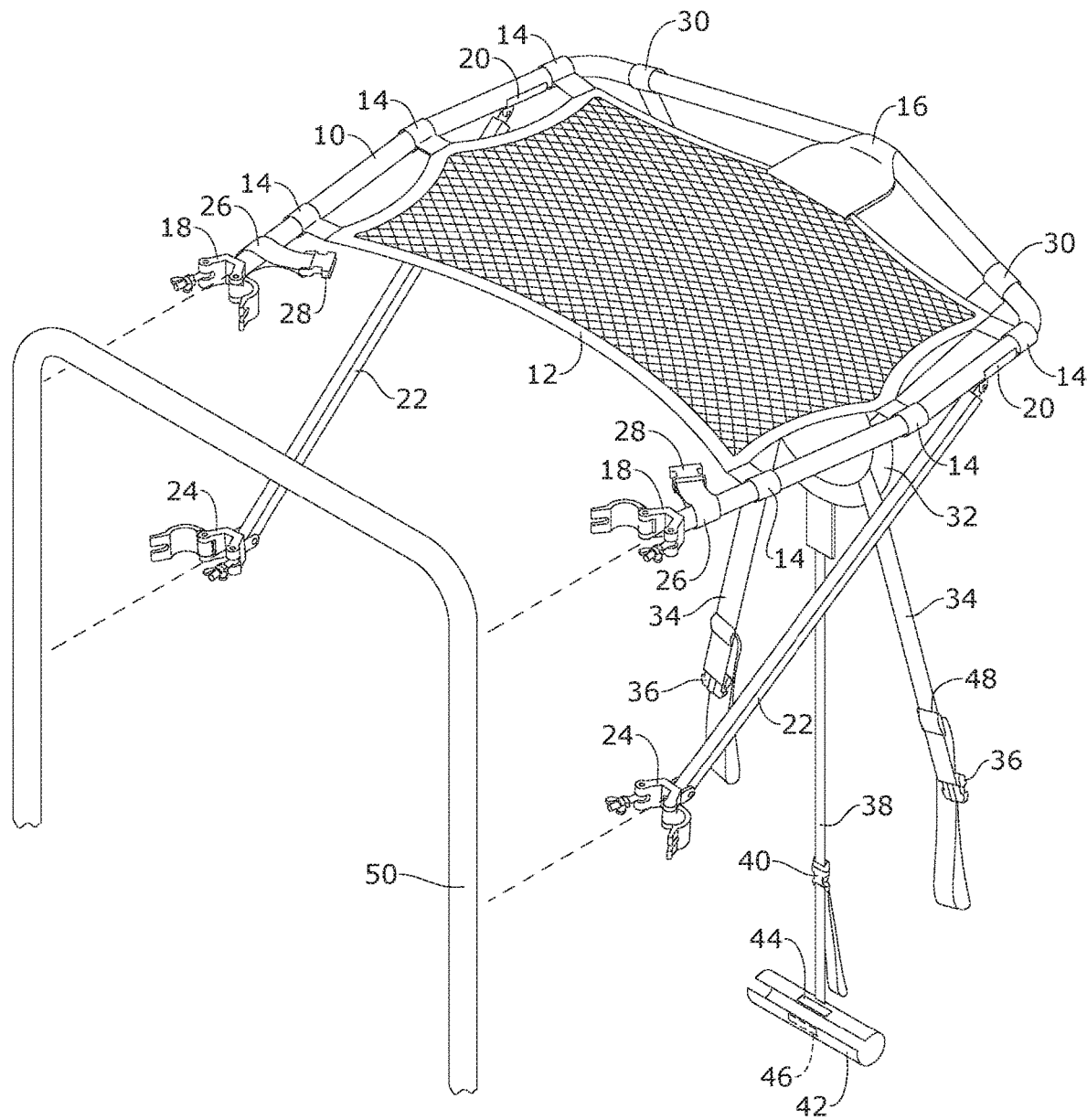
FIG. 2 is a perspective view of an exemplary embodiment of the present invention, shown in an unfolded position and illustrating its attachment to the towing component 50 (with the towing vehicle 52 not shown for clarity)
Figure 3:
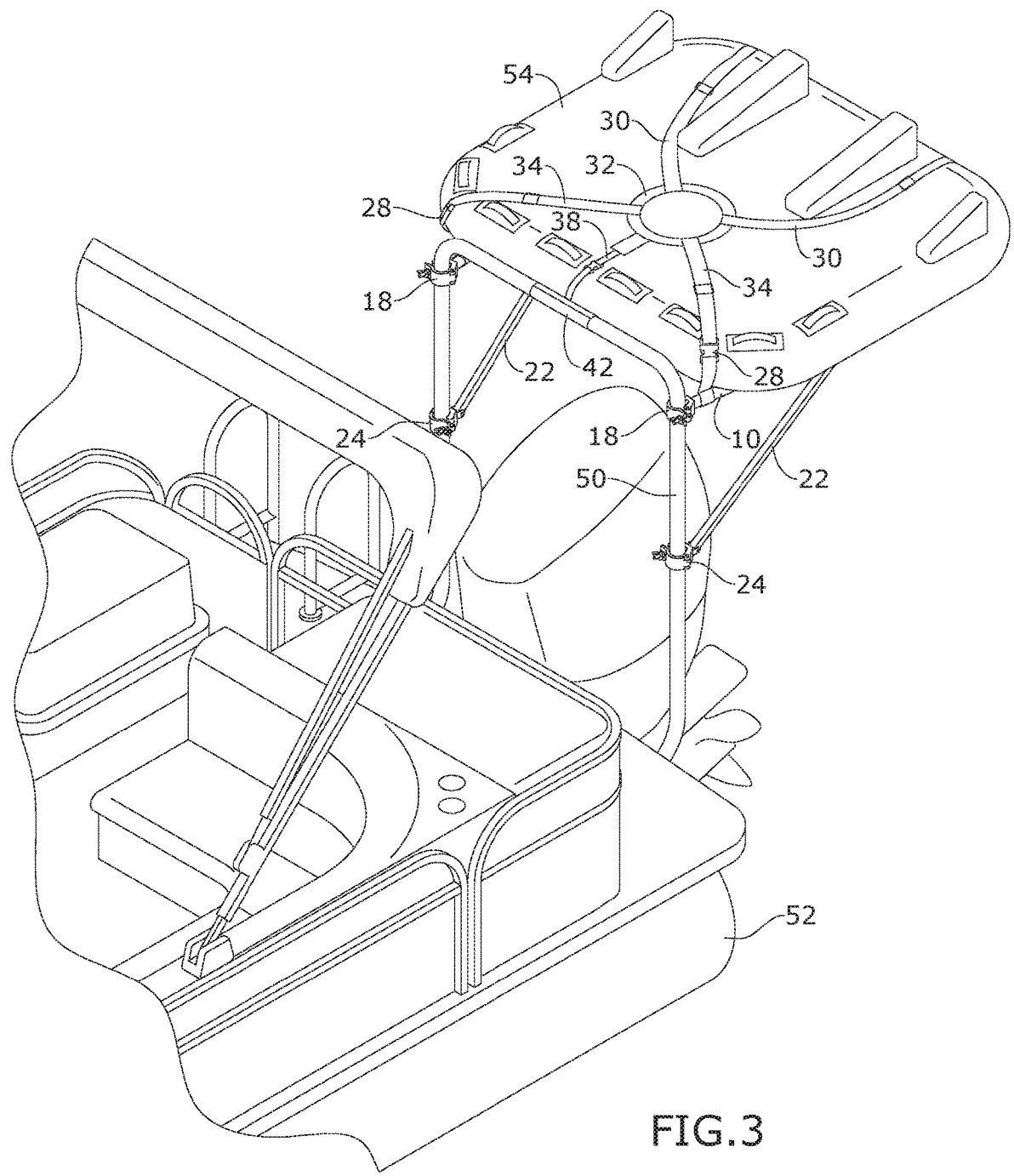
FIG. 3 is a perspective view of an exemplary embodiment of the present invention, shown in use.

Referring now to FIGS. 1 through 3, the present invention may provide a system for towing watercraft including a towable carrier 100. The towable carrier 100 having a netting 12 substantially spanning a framework 10, and first and second object strapping 30 and 34 extendable across opposing ends of the framework 10 for securing a towable object 54 against the netting 12. The towable object 54 may include but not be limited to knee boards, surf boards, boogie boards, paddle boards, flotation tubes, and the like.

The netting 12 may be integrated with the framework 10 by way of spaced apart frame straps 14 and a longitudinal strap 16. The framework 10 is also adapted for securing the towable carrier 100 to a towing component 50 of the towing vehicle 52, be it as water vehicle, as illustrated in FIG. 3, or a road vehicle, such as a car or truck (not shown). The towing component 50 may be towing frame or bar, as illustrated in FIGS. 2 and 3.

The framework 10 may be generally U-shaped and formed from lightweight yet strong elongated members. It being understood that the framework 10 may be formed in any shape and dimensions so long as the towable carrier 100 functions in accordance with the present invention as described herein. In certain embodiments, the framework 10 may be made from, but not limited to, aluminum or stainless round tubing, having a diameter between two or three inches, that are bent to form a U-shape of approximately 32 inches in length by 40 inches in width. The U-shape may have rounded corners, and the two legs of the U-shape may taper inward toward each other.

An individual may make an embodiment of framework 10 using rounded, two or three-inch diameter, aluminum or stainless-steel tubing, 90 inches in length. Such tubing may be placed on metal tube rollers so that the tubing may be bent at 14-and-half inches and bent at 15-and-half inches—this is then centered—then the individual may continue to bend the tubing at 15-and-half inches and a final bend at 14-and-half inches.

The proximal ends of the towable carrier 100, such as the terminal ends of the legs of the U-shape, may provide joining components 18 to removably attach to the towing component 50. The joining components 18 may include attachment flanges, angles, brackets, c-clamps, railing clamps, and/or the like. Adjacent to the joining components 18 may joining straps 26 ending in first strap connectors 28, such as buckles.

The first object strapping 30 may extend from a distal end of the framework 10 so as to fold over the towable object 54 and extend back to the first strap connectors 28 for securing said towable object 54. The object strapping 30 may include a centrally disposed (relative to the netting 12, during use) pad 32 interconnecting the first object strapping 30 to the second object strapping 34. The pad 32 may be circular. Each second object strap 34 may provide an adjustable component 48 and a second strap connector 36. The adjustable components 48 may be dimensioned and adapted to adjust the length of the second object strap 34 for sandwiching the towable object 54 securely to the netting 12, wherein the netting 12 provides the underneath support for the towable objects. The second strap connectors 36 may be dimensioned adapted to removably fasten to the first strap connectors 28 for securing such a sandwiched towable object 54.

Also extending from the pad 32 may be a pad strap 38 with an adjustable element 40. The pad strap 38 may provide an attachment sleeve 42 movable between an open condition (along its longitudinal length) and a closed condition forming a tube. The closed condition may be secured by opposing hook and loop fasteners 44 and 46, or equivalent removable fasteners.

The present invention may include two pivot arms 22 pivotably connected to the framework 10 at or adjacent to the distal end thereof by way of an arm clamp 20. Each pivot arm 22 may end in a removable fastener 24, such as a clamp, for securing to the towing component 50.

The present invention contemplates strap buoys. Each strap buoys may be a plastic round cylinder approximately three inches in width with straps coming from both sides. The object strapping 30 and 34 may be attached to O-rings at either end of said straps, providing buoyancy for the strapping 30 and 34 holding the secured towable object 54 in place. Thereby allowing, if the object strapping 30 and 34 falls in water, for the object strapping 30 and 34 to float.

A method of using the present invention may include the following. The towable carrier 100 may be provided. A user may place the center of the towable object 54 at the center of the netting 12. The object strapping 30 and 34 are then secured about the towable object 54, sandwich said towable object 54 between the object strapping 30 and 34/pad 32 and the netting 12, wherein the first and second connectors 28 and 36 removably lock such securement. The joining components 18 and removable fasteners 24 may be attached to the towing component 50 fixed to the towing vehicle 52. To do so, the pivot arms 22 may be selectively pivoted about the framework 10. The sleeve 42 may also be secured to the towing component 50, adding another attachment point thereto, and further sandwiching the towable object 54 with the pad strap 38—further preventing the towable object 54 from becoming air borne during transportation.

Subsequent use, the towable carrier is movable back to a flat, storable condition, as illustrated in FIG. 2.

The system of the present invention is dimensioned and adapted to not restrict a motor of the towing vehicle 52, say boat, as the towable carrier 10 is located above any motoring equipment, as illustrated in FIG. 3. If such boat is in a boat slip, the towable carrier 100 can fit comfortably in a covered dock, up to 30 feet in depth.

Additionally, the present invention enables further storage capability, such as for life preservers or other items. Also, the present invention can create a usable sea doo.

It should be understood, of course, that the foregoing relates to exemplary embodiments of the invention and that modifications may be made without departing from the spirit and scope of the invention as set forth in the following claims.

What is claimed is:

1. A towable carrier for watercraft, comprising:
   a generally U-shaped framework, said U-shape having a distal base and two legs extending generally perpendicularly from opposing ends of the distal base;
   a netting substantially coplanar with the framework extending through an area defined by the U-shape thereof;
   a joining component at a terminal end of each leg of the U-shape;
   a first connector adjacent to each joining component;
   a plurality strapping extending between the distal base and the terminal ends for removably attaching to the first connectors, wherein the plurality of strapping is movable between one or more open configurations and a sandwiching configuration removably attached to the first connectors;
   a pivot arm pivotably connected to the framework; and
   a removable fastener provided near an end of each pivot arm,
   wherein each removable fastener and joining component is for removably connecting to a towing component of a towing vehicle.

2. The towable carrier for watercraft of claim 1, further comprising a pad disposed between opposing ends of the plurality of strapping for being operatively associated with the watercraft in the sandwiching configuration.

3. The towable carrier for watercraft of claim 2, further comprising a pad strap extending from the pad; and
   an openable sleeve attached to the pad strap, wherein the openable sleeve is for removably connecting to said towing component.

4. The towable carrier for watercraft of claim 3, wherein the openable sleeve is movable between an open condition and a closed condition forming a tube for removably connecting to said towing component.

5. The towable carrier for watercraft of claim 4, further comprising hook and loop fasteners for securing the openable sleeve in the closed condition.

6. The towable carrier for watercraft of claim 1, wherein the legs taper inward toward each other.

7. A system for towing watercraft behind a motorboat, comprising:
- the towable carrier of watercraft of claim 1; and
- the towing component being an attachment frame extending upwardly from a stern of the motorboat so that the framework is elevated above all motor equipment when said towable carrier is removably connected to said towing component.

8. A system for towing watercraft behind a motorboat, comprising:
- the towable carrier of watercraft of claim 5; and
- the towing component being an attachment frame extending upwardly from a stern of the motorboat so that the framework is elevated above all motor equipment when said towable carrier is removably connected to said towing component.

\* \* \* \* \*